Patented May 9, 1933

1,907,521

UNITED STATES PATENT OFFICE

CAMILLE DREYFUS, OF NEW YORK, N. Y.

DERIVATIVES OF CELLULOSE COMPOSITIONS OF LOW INFLAMMABILITY

No Drawing.    Application filed June 7, 1928. Serial No. 283,742.

This invention relates to the production of coating compositions, films, or plastic compositions containing derivatives of cellulose and particularly organic derivatives of cellulose which have a low degree of inflammability.

An object of my invention is to provide compositions containing derivatives of cellulose, and particularly organic derivatives of cellulose, which compositions have their inflammability greatly diminished, by the addition thereto of halogen derivatives of aromatic compounds of a certain type. Other objects of my invention will appear from the following detailed description.

I have found that if halogen derivatives of aromatic compounds, wherein the halogen is substituted in a side chain attached to the aromatic nucleus, are added to compositions containing derivatives of cellulose and particularly organic derivatives of cellulose, the inflammability of the resultant product is reduced to a very great extent. This is due to the fact that the halogen breaks off more readily from a side chain than it does from the nucleus of aromatic compounds, and therefore compounds having the halogen and particularly bromine are better fire retardants than aromatic compounds containing the same amount of bromine, but which bromine is in the nucleus.

While many of the halogen compounds may be used, I prefer the bromine compounds, because they are more efficacious as fire retardants than the chlorine compounds and are considerably cheaper than the iodine compounds.

In accordance with my invention, a composition is made containing a suitable derivative of cellulose, a halogen derivative of aromatic compounds wherein at least one halogen atom is substituted in the side chain, and a suitable volatile solvent for the mixture. If desired, medium and/or high boiling solvents, plastifiers, pigments, or other effect materials may be added to the composition to impart such properties as are desired in the finished product, as is well understood in the liquid coating and plastic composition arts. The amount of solvents used will vary with the purpose to which the composition is to be put. Thus if films are to be made, 300 to 600 parts of a volatile solvent, such as acetone, will be used to 100 parts of the cellulose derivative. If a lacquer is to be prepared a larger quantity of the volatile solvent will be used; whereas if a plastic composition is to be made, the amount of volatile solvent will be considerably reduced, only such quantities being used as are necessary to form plastic compositions of the plasticity required to work them into desired shapes.

Of the derivatives of cellulose that may be used, the inorganic esters, such as cellulose nitrate, the organic esters of cellulose or the cellulose ethers may be mentioned. Examples of organic esters of cellulose are cellulose acetate, cellulose formate, cellulose propionate, cellulose butyrate. While examples of cellulose ethers are ethyl cellulose, methyl cellulose and benzyl cellulose. Any one or mixture of two or more of these organic derivatives of cellulose may be used in the preparation of the composition. Because of its ease of manufacture and its many desirable properties, I prefer to use cellulose acetate.

Any of the well known solvents or organic derivatives of cellulose may be employed, of which the following are examples: acetone, ethylene dichloride, ether, benzene, toluene, ethyl acetate, ethyl lactate, tetrachlor ethane, etc.

When plastifiers are used, such materials as triacetin, mono methyl xylene sulphonamide, para toluene sulphonanilide, diethyl phthalate, or dibutyl phthalate, or dibutyl tartrate, which are or not of themselves fire retardants, may be employed. Moreover, other plastifiers which have marked fire retardant properties such as triphenyl phosphates, or tricresyl phosphates may be employed to impart plasticity and some degree of fire resistance to the finished article.

Fillers, dyes, pigments or other effect materials and also solid inorganic fire retardants, such as calcium sulfate containing water of crystallization, may be used.

Since the proportions of ingredients to be used in making coating compositions, films or plastic compositions, may be varied as is well understood in the art, specific proportions of these ingredients will not be given.

As stated before this invention relates to the addition to compositions containing the derivatives of cellulose of aromatic compounds having aliphatic side chains wherein one or more of the halogens of the side chain is replaced by bromine or other halogens. The use of these substances as fire retardants is of great advantage, because of the fact that halogens split off more readily from a side chain than from an aromatic nucleus. Since the variety of compounds falling within this definition is so large, an attempt will be given to enumerate only a few of the more important groups of compounds.

The simplest compounds, within the definition of the substances to be used as fire retardants in accordance with my invention, are the bromine substitution products of toluene, wherein one, two or three of the hydrogen atoms of the methyl group are replaced by bromine. These compounds are benzyl bromide, $C_6H_5CH_2Br$, benzal bromide $C_6H_5CHBr_2$ and benzotribromide $C_6H_5CBr_3$. However, other bromine compounds may be used, such as the bromine derivatives of ethyl benzene, propyl benzene (cumene), the xylenes, the alkyl derivatives of naphthalene, anthracene, etc., wherein at least one hydrogen of the aliphatic groups in the side chain is replaced by bromine. It is to be understood that not only may the simple bromine derivatives of the hydrocarbon be used, but also the alcohols, the amines, the acids, the esters, etc., of these compounds are also useful as fire retardants. Moreover in accordance with my invention the use as fire retardants of these compounds, wherein one or more hydrogens of the nucleus is also replaced by the halogens is also included.

As to the relative proportions of the foregoing bromine derivative that may be used in the preparation of the coating or plastic composition containing the derivatives of cellulose, this will vary with the nature of the fire retardant and the judgment of the operator. While it may be stated roughly that the proportion of fire retardant to be used will vary from 2% to 40% of the weight of the cellulose derivative employed, the exact amount to be used must be predetermined to suit the particular requirements, and conditions of use, and of costs of materials. More or less than these proportions may be used, and it is pointed out that with cellulose nitrate, more fire retardant should be used. It may be stated, however, that with the use of a given bromine derivative, the fire retardant effect increases with the increased proportion of the compound until a point is reached wherein no further increase of resistance to burning is obtained with further increase of proportion of the ingredient, and therefore the use of a greater quantity of fire-retardant compound entails no particular advantage.

It is to be understood that the foregoing detailed description is given merely by way of illustration and that many variations may be made therein without departing from the spirit of the invention.

Having described my invention, what I claim and desire to secure by Letters Patent is:

1. A composition of matter containing an ester of cellulose and an aromatic compound having an aliphatic side chain of which at least one hydrogen thereof is substituted by a halogen.

2. A composition of matter containing an organic ester of cellulose and an aromatic compound having an aliphatic side chain of which at least one hydrogen thereof is substituted by a halogen.

3. A composition of matter containing cellulose acetate and an aromatic compound having an aliphatic side chain of which at least one hydrogen thereof is substituted by a halogen.

4. A composition of matter containing an ester of cellulose and an aromatic compound having an aliphatic side chain of which at least one hydrogen thereof is substituted by bromine.

5. A composition of matter containing an organic ester of cellulose and an aromatic compound having an aliphatic side chain of which at least one hydrogen thereof is substituted by bromine.

6. A composition of matter containing cellulose acetate and an aromatic compound having an aliphatic side chain of which at least one hydrogen thereof is substituted by bromine.

7. A plastic composition containing an organic ester of cellulose, a solvent and an aromatic compound having an aliphatic side chain of which at least one hydrogen thereof is substituted by a halogen.

8. A plastic composition containing cellulose acetate, a solvent and an aromatic compound having an aliphatic side chain of which at least one hydrogen thereof is substituted by a halogen.

9. A plastic composition containing an organic ester of cellulose, a solvent and an aromatic compound having an aliphatic side chain of which at least one hydrogen thereof is substituted by bromine.

10. A plastic composition containing cellulose acetate, a solvent and an aromatic compound having an aliphatic side chain of which at least one hydrogen thereof is substituted by bromine.

11. A composition of matter containing an ester of cellulose and benzyl bromide.

12. A composition of matter containing an ester of cellulose and benzal bromide.

13. A composition of matter containing an ester of cellulose and benzotribromide.

14. A composition of matter containing cellulose acetate and benzyl bromide.

15. A composition of matter containing cellulose acetate and benzal bromide.

16. A composition of matter containing cellulose acetate and benzotribromide.

In testimony whereof, I have hereunto subscribed my name.

CAMILLE DREYFUS.